(12) United States Patent
Castaneda

(10) Patent No.: US 8,812,234 B2
(45) Date of Patent: Aug. 19, 2014

(54) DEVICE TO AID NAVIGATION, NOTABLY INSIDE BUILDINGS

(75) Inventor: Nadir Castaneda, Paris (FR)

(73) Assignee: Commissariat a l'Energie Atomique et aux Energies Alternatives, Paris (FR)

( * ) Notice: Subject to any disclaimer, the term of this patent is extended or adjusted under 35 U.S.C. 154(b) by 116 days.

(21) Appl. No.: 13/701,507

(22) PCT Filed: May 30, 2011

(86) PCT No.: PCT/EP2011/058862
§ 371 (c)(1),
(2), (4) Date: Apr. 16, 2013

(87) PCT Pub. No.: WO2011/151297
PCT Pub. Date: Dec. 8, 2011

(65) Prior Publication Data
US 2013/0245933 A1 Sep. 19, 2013

(30) Foreign Application Priority Data
Jun. 2, 2010 (FR) ...................................... 10 54294

(51) Int. Cl.
*G01C 21/00* (2006.01)
*G08G 1/123* (2006.01)
*G01C 21/16* (2006.01)
*G01C 21/20* (2006.01)

(52) U.S. Cl.
CPC .............. *G01C 21/206* (2013.01); *G01C 21/16* (2013.01)
USPC ...................... 701/505; 701/500; 340/995.28

(58) Field of Classification Search
USPC ......... 701/445, 434, 433, 301, 536, 534, 510, 701/505, 500; 340/995.28
See application file for complete search history.

(56) References Cited

U.S. PATENT DOCUMENTS

2010/0305845 A1* 12/2010 Alexandre et al. ............ 701/201
2011/0106442 A1* 5/2011 Desai et al. ................... 701/208

FOREIGN PATENT DOCUMENTS

WO 2009/007256 A1 1/2009

OTHER PUBLICATIONS

Krach et al.,"Cascaded Estimation Architecture for Integration of Foot-Mounted Inertial Sensors", Position, Location and Navigation Symposium, 2008 IEEE/ION, IEEE , Piscataway, NJ,USA, May 5, 2008, pp. 112-119, XP031340870, ISBN: 978-1-4244-1536-6.*

(Continued)

*Primary Examiner* — Muhammad Shafi
(74) *Attorney, Agent, or Firm* — Baker and Hostetler LLP

(57) ABSTRACT

A device to aid navigation comprises: at least one inertial navigation unit; an integration module estimating the position, speed and orientation of the carrier on the basis of the data supplied by the inertial navigation unit; a digitized map of the locations in which the carrier moves, said map storing a navigable network along which the carrier may move; a module for generating position pseudo-measurements on the basis of the position estimated by the integration module and cartographic data supplied by the digitized map, a position pseudo-measurement indicating the position which should be estimated by the integration module in the presence of movement constraints imposed by the digitized map of the locations; an indirect extended Kalman filter connected to the module for generating position pseudo-measurements by a switch, said filter estimating the errors relating to the position, speed and orientation, and also any other variable associated with the inertial navigation unit, estimated by the integration model on the basis of the position pseudo-measurements produced by the module; a module indicating the availability of a pseudo-measurement of the module controlling the closing of the switch when a pseudo-measurement is available and opening it in the opposite case; the output of the integration module, indicating the position, speed and orientation estimation, being connected to the module for generating position pseudo-measurements, to the Kalman filter and to the positive input of a filter of a subtractor.

6 Claims, 3 Drawing Sheets

(56) References Cited

OTHER PUBLICATIONS

Nikolas Trawny, et al., "Indirect Kalman Filter for 3D Attitude Estimation", Mar. 31, 2005, URL:http://www-users.cs.umn.edu/~trawny/Publications/Quaternions_3D.pdf, pp. 14-20, XP002617001.

Berhard Krach, et al., "Cascaded Estimation Architecture for Integration of Foot-Mounted Inertial Sensors", 2008 IEEE/ION Position, Location and Navigation Symposium, May 5, 2008, pp. 112-119, IEEE, Piscataway, NJ, USA, XP031340870.

Widyawan, et al., "A Backing Tracking Particle Filter for fusing Building Plans with PDR Displacement Estimates", Proceedings of the 5th Workshop on Position, Navigation and Communication, Mar. 27, 2008, pp. 207-212, IEEE, Piscataway, NJ, USA, XP031247849.

Maan E. El Najjar, et al., "A Road-Matching method for Precise Vehicle Localization Using Belif Theory and Kalman Filtering", Autonomous Robots, Sep. 1, 2005, pp. 193-191, vol. 19, No. 2, Springer Science & Business Media Inc., NL, XP019204923.

Daniela Buchel, et al., Navigation Pedestre a L'Interieur des Batiments [Pedestrian Navigation Inside Buldings], Geodesie/Mensuration, Nov. 2004, pp. 664-668.

\* cited by examiner

DEVICE TO AID NAVIGATION, NOTABLY INSIDE BUILDINGS

CROSS-REFERENCE TO RELATED APPLICATIONS

This application is a National Stage of International patent application PCT/EP2011/058862, filed on May 30, 2011, which claims priority to foreign French patent application No. FR 1054294, filed on Jun. 2, 2010, the disclosures of which are incorporated by reference in their entirety.

FIELD OF THE INVENTION

The present invention relates to a device to aid navigation, based on the use of an inertial navigation unit. More particularly, the invention relates to a novel method for the fusion of cartographic data aiming to cancel the drift errors in inertial navigation systems. It applies notably to the guidance of persons with impaired vision inside buildings, or to the guidance of emergency teams in buildings or places inaccessible to the radiofrequency waves used in GPS systems.

BACKGROUND

Navigation aid systems for use inside buildings, and more generally in places inaccessible to communication via satellite, cannot currently use positioning or georeferencing systems such as GPS. Inside buildings, it must therefore be possible to use other types of navigation systems. In this case, one of the possible solutions is based on the use of an inertial navigation system.

An inertial navigation system is a navigation aid based on movement sensors (accelerometers) and rotation sensors (gyrometers) contained, for example, in an inertial navigation unit. The measurements obtained from these sensors are used to calculate the position, speed and orientation of the inertial navigation unit and, consequently, of the person carrying this system. Unlike other systems, notably systems for positioning via satellite (GPS), via Wi-Fi terminals, Bluetooth, etc., inertial navigation systems are completely autonomous in the sense that they do not depend on the transmission or reception of signals in relation to an external source. They are thus suitable for environments inaccessible to electromagnetic waves. However, these inertial navigation systems depend on the a priori knowledge of the position, speed and orientation of the inertial navigation unit (and therefore the carrier of the system) at the start of the navigation. This information can be supplied by the system operator or can be estimated at the start on the basis of other types of sensor (GPS, RFID, etc.). The position, speed and orientation of the inertial navigation unit are updated progressively on the basis of the measurements of the inertial sensors by suitable algorithms.

In its simplest implementation, a standard inertial navigation system comprises a computing unit and inertial sensors of the accelerometer and gyrometer type. In a general manner, the computing unit mainly comprises two modules: the integration module and the error estimation module. The first is dedicated to the calculation of the position, speed and orientation of the navigation unit through the integration of inertial signals. The second module is dedicated to the estimation of drift errors caused by inertial sensor shortcomings. This estimation is typically carried out using an indirect Kalman filter, the inputs of which depend on additional information sources such as navigable maps, compasses, GPS, etc. The success of these systems depends largely on the accuracy of inertial sensors, the available additional information sources and the manner of making use of the latter.

Given that most navigation systems give the position and orientation of the carrier in relation to a digitized navigation map describing the navigable space, this digital map represents the most readily accessible additional information source for correcting drift errors. This results in methods for fusing inertial data and cartographic data, aiming to increase the accuracy of the inertial navigation systems. Consequently, a problem to be resolved lies in obtaining a method for fusing cartographic data in order to correct the drift errors of an inertial navigation system meeting the following requirements:

Having a low complexity of the method in order to allow a better response to the real-time constraints in hardware and software architectures having a limited computing capacity;

Being suitable for existing navigation maps in navigation and guidance systems commonly used for route calculations;

Being independent of the change model of the navigating object.

In particular, it must be noted that, for the navigation device to be portable, i.e. light and small, it must be implemented in dedicated hardware architectures commonly known as "on-board systems". In a general manner, these systems have constraints in terms of computing power, memory space, energy consumption, etc. Consequently, the location methods taking account of cartographic data must take account of these constraints.

Current solutions do not allow these requirements to be met. In particular, methods can be found in the prior art based on particle filters, known to have a high computing power requirement, or methods based on direct Kalman filters, requiring change models of the navigating object.

As far as solutions based on particle filters are concerned, the document by B. Krach and P. Roberston, Cascaded estimation architecture for integration of foot-mounted inertial sensors, Proc. IEEE/ION Position, Location and Navigation Symposium, 2008, pp. 112-119, proposes an inertial navigation system for pedestrians using the technology of MEMS-based miniature inertial navigation units. The solution uses the standard navigation system, previously described, and adds a second data processing module, the inputs of which are the outputs of the standard navigation system, i.e. the estimated position, speed and orientation, and also the cartographic data. The fusion of these inputs is carried out via a particle filter. For its part, the particle filter brings the cartographic data into play via a change model associated with the particles. The principle of this change is as follows: each particle, representing a hypothetical position and orientation of the carrier, for example the pedestrian, changes to a different position provided that there is no obstacle between these two positions. The geographical location of the obstacles, representing walls, for example, is known in advance thanks to the digital map of the locations.

A different document by Widyawan, M. Klepal, and S. Beauregard, A backtracking particle filter for fusing building plans with pdr displacement estimates, Proc. 5th Workshop on Positioning, Navigation and Communication WPNC 2008, 27-27 Mar. 2008, pp. 207-212, presents a system similar to that of the preceding document for the fusion of inertial and cartographic data. The only difference is that, according to this second document, a conventional error estimation algorithm is not implemented, i.e. the algorithm based on a Kalman filter, but the API (Application Programming Interface) supplied by the manufacturer of the inertial navigation unit is used directly in order to obtain an estimation of the orientation of the inertial navigation unit. This API uses a Kalman filter to estimate the orientation of the inertial navigation unit on the basis of the measurements of the accelerometers, gyrometers and magnetometers. On the basis of this estimation, the authors of the document apply conventional integration formulae to the measurements of the accelerometers in order to obtain the position and speed of the pedestrian carrying the navigation system.

The solutions proposed in these documents nevertheless have a plurality of disadvantages:

It is well known that particle filters make intensive use of computing time, which makes their real-time implementation possible only on very powerful and barely portable platforms;

More particularly, the approaches proposed by the two preceding documents need to know if a wall has been passed through between two consecutive steps of the carrier. This presupposes a real-time test to determine if the straight-line segment described by the two positions, of the two steps, intersects with a straight-line segment representing a wall. The test may prove to be lengthy and time-consuming if the number of walls is large, in the case, for example, of a building with a large number of rooms. This test is all the more time-consuming bearing in mind that it must be carried out for each of the hypotheses, particles, of which the number must be large enough in order to obtain an accurate estimation of the position of the pedestrian;

These approaches require a digital map of the locations, designed specifically for this purpose. In other words, these approaches do not gain any benefit from the conventional navigation maps which are often used in conventional navigation systems (GPS, tomtom, etc.). Consequently, a navigation system which uses the algorithms proposed in the preceding documents requires a second specific navigation map in order to be able to calculate, in addition to the position and orientation, the route to be followed by the pedestrian.

As far as the use of the algorithms based on Kalman filters is concerned, a plurality of solutions have been proposed. In particular, various methods for integrating cartographic data into Kalman filtering have been proposed for land and air vehicle tracking applications. All of these techniques apply to the direct Kalman filter, where the change model of the vehicle is available. Given that, in the context of pedestrian inertial navigation, the indirect Kalman filter is used, because the change model of the pedestrian is not known, the algorithms based on an implementation of the direct Kalman filter do not apply.

In a general manner, the indirect Kalman filter is the tool most often used in an error estimation module. This is due to the fact that it can operate in real time at a very high rate, and due to the fact that it is independent from the change model of the inertial navigation unit, i.e. the dynamic model describing the changes in the position, speed and orientation of the navigation unit over time. In fact, the indirect Kalman filter follows the changes in the errors of the integration module and not the changes in the position, speed and orientation of the navigation unit. Consequently, the indirect Kalman filter is independent from this change model. This offers an advantage, for example for locating a pedestrian, since, at the current time, it is not known how to model the movement of the navigation unit when it is attached to the pedestrian, ideally placed on the foot of the latter. Nevertheless, this independence also results in the impossibility of directly considering the movement constraints, introduced by the cartographic data, in the indirect Kalman filter.

One way to get round this obstacle to the fusion of inertial data and cartographic data, in the context of the indirect Kalman filter, is to use the technique known as "map-matching". This technique consists in taking the output of the standard navigation system, i.e. the position, and projecting it onto the digitized navigation map in order to obtain a "corrected" position.

The document by Daniela Büchel and Pierre-Yves Gilliéron, Navigation pédestre à l'intérieur des bâtiments ["Pedestrian navigation inside buildings"], Géomatique Suisse 11/2004 (2004), pages 664-668, proposes two map-matching techniques suitable for pedestrian navigation. The first of these techniques, referred to as point-to-point map-matching, re-adjusts the estimated position in relation to the nearest node of the map. These nodes represent characteristic points such as doors, junctions, or floor connectors. The second technique, referred to as point-to-edge map-matching, determines the nearest edge of the estimated position. The edges represent a route portion modeled by a straight line between two nodes.

One disadvantage of these map-matching techniques is notably that they do not contribute to the estimation of errors of the integration module. In particular, apart from the position which is possibly re-adjusted, orientation and speed errors are not corrected. This lack of corrections results in the medium term in an increase in the errors, ultimately having an adverse effect on the estimated position.

SUMMARY OF THE INVENTION

One object of the invention is to overcome the aforementioned disadvantages. To do this, the object of the invention is notably a device to aid navigation, suitable for being fitted to a carrier, this device comprising:

at least one inertial navigation unit;

an integration module estimating the position, speed and orientation of the carrier on the basis of the data supplied by the inertial navigation unit;

a digitized map of the locations in which the carrier moves, said map storing a navigable network along which the carrier may move;

a module for generating position pseudo-measurements on the basis of the position estimated by the integration module and cartographic data supplied by the digitized map, a position pseudo-measurement indicating the position which should be estimated by the integration module in the presence of movement constraints imposed by the digitized map of the locations;

an indirect extended Kalman filter connected to the module for generating position pseudo-measurements by a switch, said filter estimating the errors relating to the position, speed and orientation, and also any other variable associated with the inertial navigation unit, estimated by the integration model on the basis of the position pseudo-measurements produced by the module;

a module indicating the availability of a pseudo-measurement of the module controlling the closing of the switch when a pseudo-measurement is available and opening it in the opposite case;

the output of the integration module, indicating the position, speed and orientation estimation, being connected to the module for generating position pseudo-measurements, to the Kalman filter and to the positive input of a subtractor filter, the errors estimated by the Kalman filter being supplied to the negative input of the subtractor, the output of said subtractor supplying the corrected position, speed and orientation of the carrier.

The corrected position, speed and orientation data presented at the output of the subtractor are, for example, sent to the integration module so that the latter carries out the next position estimation on the basis of these data.

The device comprises, for example, a module for generating a pseudo-measurement of the speed of the inertial navigation unit, a speed pseudo-measurement indicating the speed which should be estimated by the integration module when it is detected that the navigation unit is not moving, an indirect Kalman filter estimating the errors relating to the position, speed and orientation estimated by the integration module on the basis of the speed pseudo-measurements produced by the module, the corrected data at the output of the subtractor being relative to the position, speed and orientation of the carrier.

The level of accuracy of a position pseudo-measurement can be defined using a covariance matrix, said matrix modeling the uncertainty in the position of the carrier around an edge s on which the carrier is located, said edge being located inside the navigable network stored on the digitized map.

The covariance matrix R(s) is, for example, defined according to the following relation:

$$R(s) = \Phi_s \begin{bmatrix} \sigma_o^2 & 0 & 0 \\ 0 & \sigma_a^2 & 0 \\ 0 & 0 & \sigma_n^2 \end{bmatrix} \Phi_s^T$$

where $\Phi_s$ is the conventional rotation matrix associated with the edge s and where $\sigma_o^2$ and $\sigma_n^2$ represent the uncertainties of the position in the two directions which form the plane orthogonal to the edge s and $\sigma_a^2$ the uncertainty along the edge s of the navigable network.

BRIEF DESCRIPTION OF THE DRAWINGS

Other characteristics and advantages of the invention will become clear from the attached drawings, in which.

DETAILED DESCRIPTION

Figure 1:
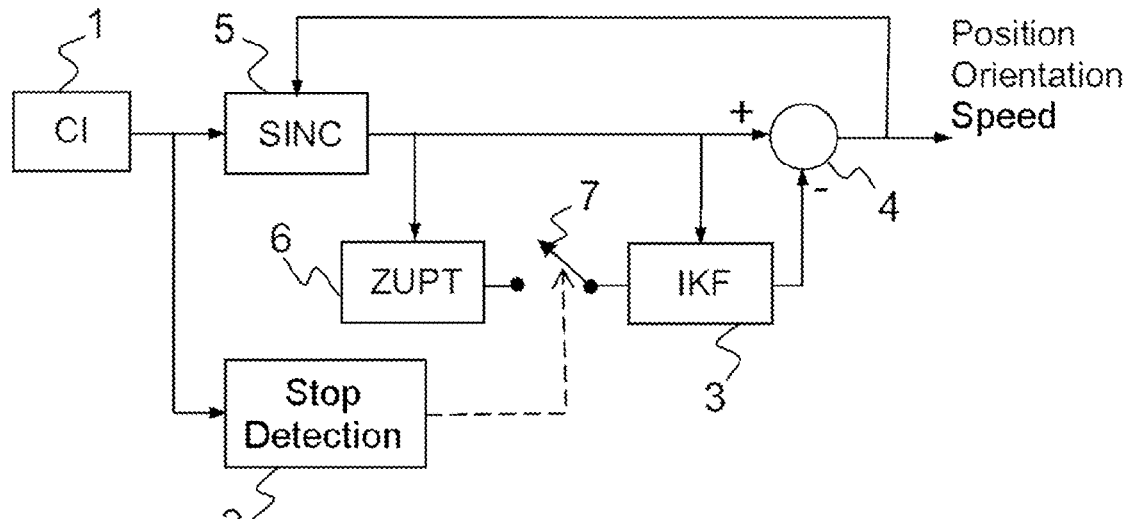
FIG. 1 shows an example of a navigation aid system according to the prior art.

FIG. 1 shows, by way of example, a navigation aid system according to the prior art comprising a module 5 consisting of an integrator, a module 3 dedicated to the estimation of errors by an indirect Kalman filter, a module 2 for step detection and a module 6 for generating speed pseudo-measurements. The inertial data at the input of the modules 2 and 5 originate from an inertial navigation unit 1, notably containing inertial sensors of the triple-axis gyrometer and accelerometer type. In a conventional manner, the output of the module 5 is connected to the modules 6 and 3 and to a subtractor 4. The module 6 is connected to the module 3 only if a switch 7 is closed. The module 2 closes the switch 7 when a step has been detected and opens it in the opposite case. The module 3 receives at its input the output of the module 6 when the switch 7 is closed, in order to estimate the errors of the module 5. The errors estimated by the module 3 are then used in the subtractor 4 to correct the position, speed and orientation estimations calculated by the module 5. Finally, the position, speed and orientation thus corrected at the output of the subtractor 4 are forwarded to the module 5, so that the latter carries out the next estimation on the basis of error-free data Despite its simplicity of implementation, the use of this system does not give good results for a navigation in the medium term. Moreover, it is well known that the use of the speed pseudo-measurement does not allow the errors linked to yaw or heading to be estimated.

Figure 2:
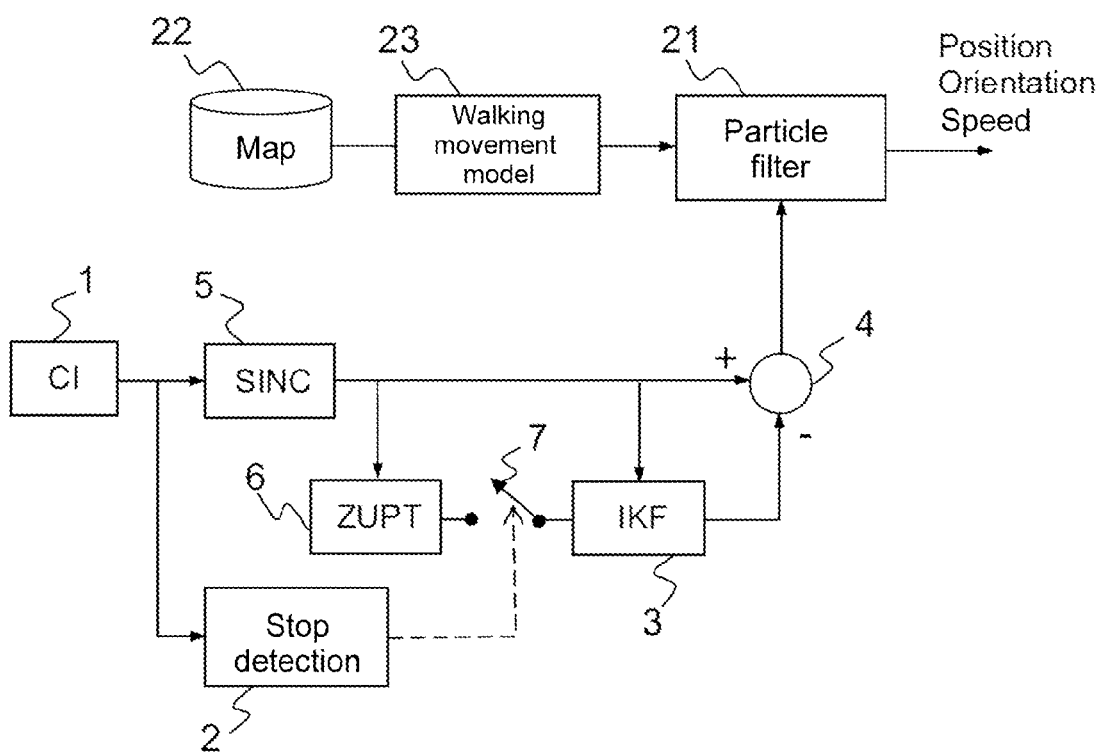
FIG. 2 shows another example of a navigation aid system according to the prior art.

FIG. 2 shows a further system according to the prior art using a particle filter. This solution takes up from the system shown in FIG. 1, the output of the subtractor 4 being connected to an input of a module 21 having the function of fusing the data originating from the subtractor 4 with the cartographic data by means of a particle filter. More particularly, the position, speed and orientation and their covariance matrices estimated by the system in FIG. 1 are processed by the particle filter. A simplified model of the walking movement of the carrier can be defined thanks to the processing of these variables, supplied with each detected step. A walking movement model 23 adapted to the cartographic constraints is taken into account by the particle filter in order to estimate the position and orientation of the inertial navigation unit 1. As previously indicated, a system according to FIG. 2 does not allow a response to the constraints above.

Figure 3:
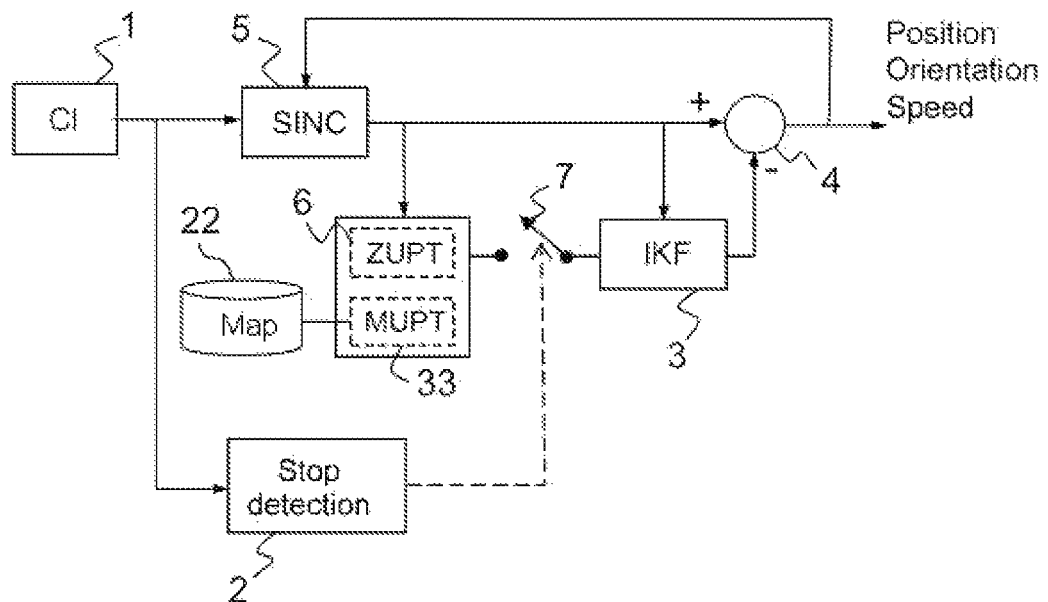
FIG. 3 shows an example embodiment of a navigation aid system according to the invention.

FIG. 3 shows an example embodiment of a device according to the invention suitable for being fitted to a carrier. It again comprises an inertial navigation unit 1 and an integration module 5 as previously described, and also a step detection module 2, these last two modules 2, 5 being fed with the data supplied by the inertial navigation unit. The device according to the invention uses an indirect Kalman filter 3 as an error estimation module. The cartographic data are directly integrated into this Kalman filter 3 by means of a procedure, referred to below as "MUPT", represented by a module 33. This module generates a position pseudo-measurement and its level of accuracy based on the position estimated by the integration module 5 and the cartographic data supplied by the digitized map 22. The position pseudo-measurement thus generated is supplied to the module 3 only if the switch 7 connecting this module to the module 33 is closed. The module 2 closes the switch 7 when a step has been detected and opens it in the opposite case. The level of accuracy of the pseudo-measurement is defined using a covariance matrix as described in the continuation of this description.

The position pseudo-measurement indicates the position which should be estimated by the integration module 5 when the movement constraints imposed by the digitized map of the locations are considered. Given that this estimation is based on an imperfect modeling of the map, the covariance matrix reflecting the uncertainty of the estimation is also determined in the module 33 "MUPT". This information is then supplied to the error estimation module 3, consisting of the indirect Kalman filter, in order to be processed in a probabilistic manner to update the orientation, speed and position error and any other variable to be estimated by the Kalman filter.

The invention thus allows the cartographic data to be integrated directly and in real time into the error estimation module 3. Thus, the cartographic data also contribute to the drift error estimation of the integration module 5. Unlike other systems of the prior art, notably illustrated by FIG. 2, where particle filters are used for the fusion of cartographic data, the method according to the invention is economical in terms of computing and is consequently suitable, for example for on-board and/or real-time applications. Furthermore, the use of the MUPT procedure allows the estimation of the errors of the three components linked to the orientation, i.e. roll, pitch and yaw, in contrast to the system shown in FIG. 1. In fact, it is well known that the use of the speed pseudo-measurement does not allow yaw errors to be estimated.

Thus, the system according to the invention shown in FIG. 3 comprises one or more inertial navigation units 1, an integration module 5, a module for generating position pseudo-measurements 33 as previously described, a digitized map 22, an indirect Kalman filter 3 to carry out the error estimation and a step detector 2. Optionally, a generator of speed pseudo-measurements 6 can also be included. The mode of operation is as follows: the output of the module 5 is connected to the modules 33, 3, and to the positive input of a subtractor 4 and optionally to the module 6. In this case, the module 33 and the module 6 are connected to the module 3 only if the switch 7 is closed. The module 2 closes the switch 7 when a step has been detected and opens it in the opposite case. The module 3 receives at its input the pseudo-measurements produced by the modules 33 and 6, when the switch 7 is closed, in order to estimate the errors of the module 5. The errors estimated by the module 3 are then used in the negative input of the subtractor 4 to correct the position, speed and orientation estimations calculated by the module 5, the subtractor taking away the value present at its negative input from the value present at its positive input. Finally, the position, speed and orientation thus corrected at the output of the subtractor 4 are forwarded to the module 5 so that the latter carries out the next estimation on the basis of error-free data.

Figure 4:
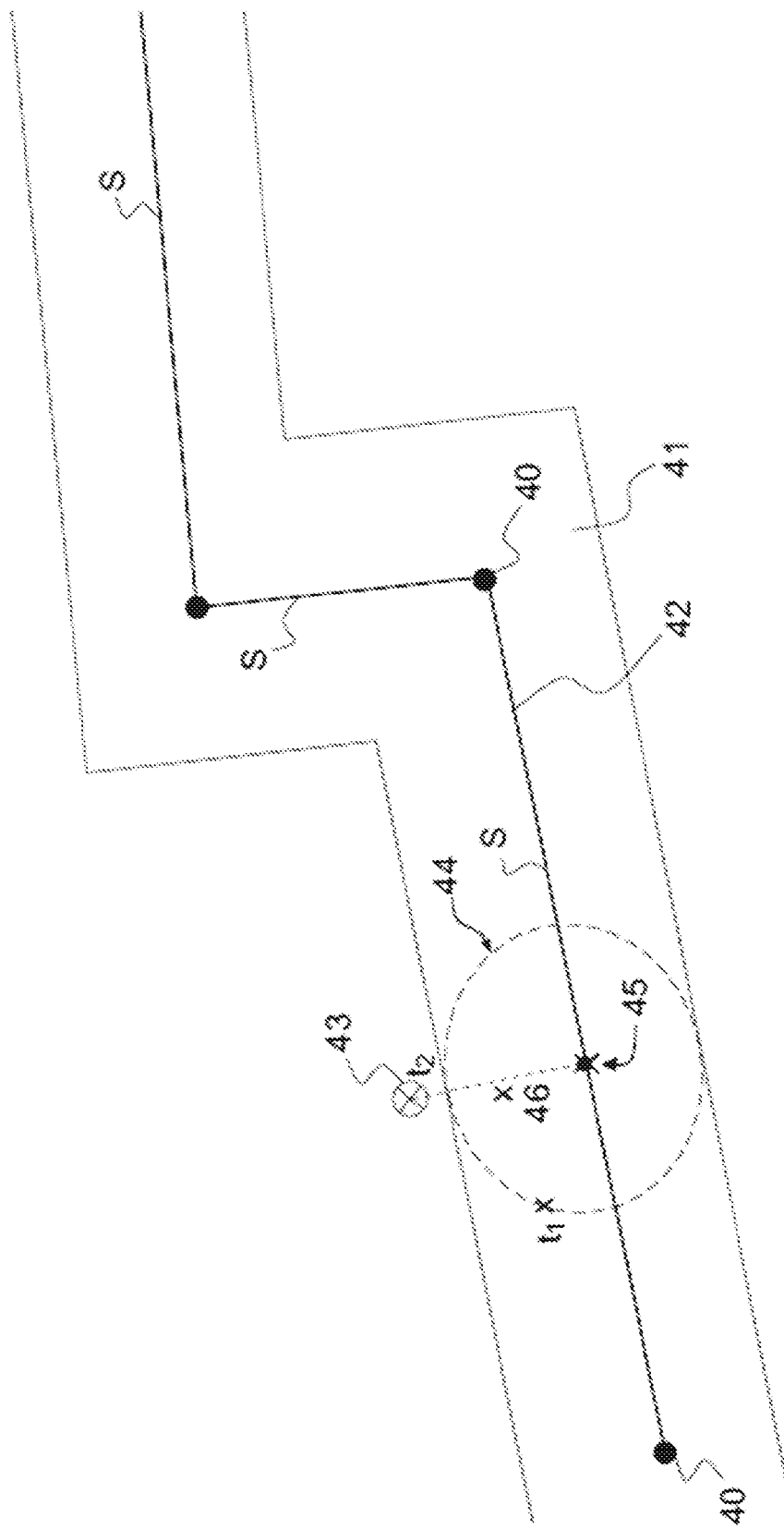
FIG. 4 shows an illustration of the processing principle applied by a system according to the invention.

FIG. 4 shows the conceptual context of the invention. More particularly, FIG. 4 presents by way of example a corridor 41 inside a building in which a carrier of a system according to the invention must move. The corridor, modeled by edges s comprised between nodes 40, forms part of the navigable network 42 recorded in the digitized map 22.

The integration module 5 continuously calculates the position of the inertial navigation unit 1, fixed, for example, to the shoe of the pedestrian, on the basis of noisy measurements of inertial sensors. At a given time t2, the position calculated 43 by the integration module may be located outside the navigable domain 41 due to drift errors caused by the shortcomings of the inertial sensors. This position being incorrect, it must be corrected in order to avoid propagation of the error over time. To do this, the module MUPT 33 projects the position 43 onto the navigable network in order to generate a position pseudo-measurement 45 which belongs to the navigable network 42. Given that the true position of the carrier 46 may be located on any given point around the edge s and not necessarily on the projection 45, the module MUPT 33 also defines a confidence zone 44 centered on the projection 45 and adapted to the edge s. Finally, the module MUPT 33 supplies the indirect Kalman filter with the position pseudo-measurement with a level of accuracy defined, in the example, by the ellipse 44. The filter processes these data to calculate the drift errors of the integration module.

The Kalman filter is a recursive estimator. In other words, only the preceding state and the current measurements are necessary in order to estimate the current state, in this case the measurements of the module MUPT 33 and optionally of the module ZUPT 6. The filter has two distinct phases, the prediction and the update. The prediction phase uses the estimated state of the preceding time to produce an estimation of the current state. In the update step, the observations of the current time are used to correct the predicted state in order to obtain a more accurate estimation. The invention uses, for example, an indirect Kalman filter. In a standard implementation of the direct Kalman filter, the states such as the orientation, speed and position would be located among the variables of the filter and the measurements would be the inputs of the integration module 5, such as the accelerations and rotation speeds measured by the inertial sensors. In the indirect Kalman filter, the orientation, speed and position errors are located among the estimated variables and the measurement presented to the filter is the difference between the output of the integration module 5 and an additional information source which, in this case, are the outputs of the modules MUPT 33 and ZUPT 6.

In a more formal manner, let it be assumed that a pedestrian carrying the system is located on the edge s of the navigable network 42, and that the position estimated by the integration module 5 at the current time is $\hat{r}$. The projection of $\hat{r}$ onto s can be written according to the following relation:

$$y_r = f_s(\hat{r}) \quad (6)$$

where $f_s(\cdot)$ is a vector function, the form of which depends on the chosen projection type (orthogonal or probabilistic) and on the edge s.

For the sake of simplicity, the model allowing the pseudo-measurement $y_r$ and the true position of the pedestrian r to be connected can be written according to the following relation:

$$y_r = r + w_r(s) \quad (7)$$

where $w_r(s)$ is a Gaussian white noise with a zero mean and a covariance matrix R(s). The matrix R(s) is deemed to model the uncertainty in the position of the carrier around the edge s. The directional noise model defined according to the following relation can be used for this purpose:

$$R(s) = \Phi_s \begin{bmatrix} \sigma_o^2 & 0 & 0 \\ 0 & \sigma_a^2 & 0 \\ 0 & 0 & \sigma_n^2 \end{bmatrix} \Phi_s^T \quad (8)$$

where $\Phi_s$ is the conventional rotation matrix associated with the edge s and where $\sigma_o^2$ and $\sigma_n^2$ represent the uncertainties of the position in the two directions which form the plane orthogonal to the edge s and $\sigma_a^2$ the uncertainty along the edge s of the navigable network 42.

Taking into account the error definition on the position written as $$\delta r = r - \hat{r}$$

where r is the true position of the navigation unit, and replacing r with the position pseudo-measurement $y_r$, the measurement model for the indirect Kalman filter is obtained, given by $$z_{\delta r} = y_r - \hat{r} \quad (9)$$
$$= \delta r + w_r$$

Figure 5:
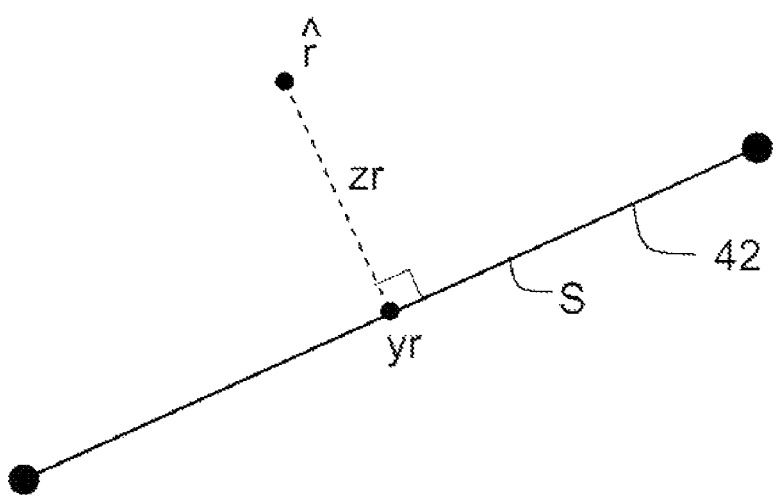
FIG. 5 shows an illustration of the data taken into account by an error estimator used in a system according to the invention.

A more detailed analysis of the equation (9) reveals that the input of the Kalman filter $z_{\delta r}$ is a measurement of the deviation between the position $\hat{r}$ estimated by the integration model 5 and its projection $y_r$ onto the map, shown by FIG. 5. This deviation is modeled as a random Gaussian variable with a mean δr and a covariance matrix R(s). Consequently, the Kalman filter 3 estimates a value of δr such that the corrected value of the position r=δr+r̂ is close to the edge which models the position of the pedestrian on the map. In other words, the drift errors, introduced by the presence of errors in the measurements $y_a$ and $y_g$ of the accelerometers and gyrometers are constrained by the cartography of the locations.

A system according to the invention notably has the following advantages:

The economical processing of the cartographic data allows the design of accurate inertial navigation systems in architectures with a limited computing power. This entails the design of navigation devices which are very portable and autonomous, while retaining a very high accuracy in terms of the positioning of the carrier on the map. One conceivable example is an inertial navigation system implemented in a PDA or in a mobile telephone;

The MUPT module 33 is based on the navigation map model most frequently used by terrestrial navigation systems, i.e. the node-edge model. Consequently, the proposed technique does not require a dedicated cartography;

The invention can easily be incorporated by existing inertial navigation systems wishing to make use of location cartography without requiring significant modifications in the implementation of the system. In fact, given that the "MUPT" module 33 supplies the cartographic information to the error estimation module 3 as an input, this does not result in major modifications to the code previously used.

The invention is perfectly suitable for a real-time guidance application for pedestrians inside a building. Thus, the invention can be applied, for example, to the navigation aid of persons with impaired vision in corridors and underground railway stations, or for the assistance of emergency services, such as fireman or policemen, for example, during a call-out. The invention can also be applied to provide guidance outside.

Finally, a device according to the invention can be applied not only to the guidance of persons, but also to the guidance of controllable objects, notably robots.

The invention claimed is:

1. A device to aid navigation, said device being suitable for being fitted to a carrier, said device comprising:
   at least one inertial navigation unit;
   an integration module estimating the position, speed and orientation of the carrier on the basis of the data supplied by the inertial navigation unit; a digitized map of the locations in which the carrier moves, said map storing a navigable network along which the carrier may move;
   a module for generating position pseudo-measurements on the basis of the position estimated by the integration module and cartographic data supplied by the digitized map, a position pseudo-measurement indicating the position which should be estimated by the integration module in the presence of movement constraints imposed by the digitized map of the locations;
   an indirect extended Kalman filter connected to the module for generating position pseudo-measurements by a switch, said filter estimating the errors relating to the position, speed and orientation, and also any other variable associated with the inertial navigation unit, estimated by the integration model on the basis of the position pseudo-measurements produced by the module; and
   a module indicating the availability of a pseudo-measurement of the module controlling the closing of the switch when a pseudo-measurement is available and opening it in the opposite case; the output of the integration module, indicating the position, speed and orientation estimation, being connected to the module for generating position pseudo-measurements, to the Kalman filter and to the positive input of a subtractor filter, the errors estimated by the Kalman filter being supplied to the negative input of the subtractor, the output of said subtractor supplying the corrected position, speed and orientation of the carrier.

2. The device as claimed in claim 1, wherein the corrected position, speed and orientation data presented at the output of the subtractor are sent to the integration module so that the latter carries out the next position estimation on the basis of these data.

3. The device as claimed in claim 1 further comprising a module generating a pseudo-measurement of the speed of the inertial navigation unit, a speed pseudo-measurement indicating the speed which should be estimated by the integration module when it is detected that the navigation unit is not moving, an indirect Kalman filter estimating the errors relating to the position, speed and orientation estimated by the integration module on the basis of the speed pseudo-measurements produced by the module, the corrected data at the output of the subtractor being relative to the position, speed and orientation of the carrier.

4. The device as claimed in claim 1 wherein the level of accuracy of a position pseudo-measurement is defined using a covariance matrix, said matrix modeling the uncertainty in the position of the carrier around an edge s on which the carrier is located, said edge being located inside the navigable network stored on the digitized map.

5. The device as claimed in claim 4, wherein the covariance matrix R(s) is defined according to the following relation:

$$R(s) = \Phi_s \begin{bmatrix} \sigma_o^2 & 0 & 0 \\ 0 & \sigma_a^2 & 0 \\ 0 & 0 & \sigma_n^2 \end{bmatrix} \Phi_s^T$$

where $\Phi_s$ is the conventional rotation matrix associated with the edge s and where $\sigma_o^2$ and $\sigma_n^2$ represent the uncertainties of the position in the two directions which form the plane orthogonal to the edge s and $\sigma_a^2$ the uncertainty along the edge s of the navigable network.

6. The device as claimed in claim 1 wherein the digitized map describes the inside of a building.

* * * * *